United States Patent
Komatsu et al.

(10) Patent No.: US 8,130,516 B2
(45) Date of Patent: Mar. 6, 2012

(54) SWITCHING POWER SUPPLY CONTROL SEMICONDUCTOR INTEGRATED CIRCUIT SAMPLING AN AUXILIARY WIRING VOLTAGE NEAR A POINT AT WHICH A SECONDARY RECTIFIER DIODE CURRENT BECOMES ZERO

(75) Inventors: Masaki Komatsu, Atsugi (JP); Yuji Yamanaka, Atsugi (JP)

(73) Assignee: Mitsumi Electric Co., Ltd., Tama-shi (JP)

( * ) Notice: Subject to any disclaimer, the term of this patent is extended or adjusted under 35 U.S.C. 154(b) by 738 days.

(21) Appl. No.: 12/162,948

(22) PCT Filed: Jan. 29, 2007

(86) PCT No.: PCT/JP2007/051365
§ 371 (c)(1),
(2), (4) Date: Jul. 31, 2008

(87) PCT Pub. No.: WO2007/088803
PCT Pub. Date: Aug. 9, 2007

(65) Prior Publication Data
US 2009/0021968 A1    Jan. 22, 2009

(30) Foreign Application Priority Data
Jan. 31, 2006  (WO) ................. PCT/JP2006/301519

(51) Int. Cl.
*H02M 3/335* (2006.01)
(52) U.S. Cl. ............... 363/21.16; 363/21.08; 363/97

(58) Field of Classification Search ............... 363/21.01, 363/21.08, 21.16, 97
See application file for complete search history.

(56) References Cited

U.S. PATENT DOCUMENTS

| 6,459,594 | B1 | 10/2002 | Tsuji et al. |
| 7,778,049 | B2 * | 8/2010 | Morota ................. 363/21.12 |
| 2005/0259455 | A1 * | 11/2005 | Mori ..................... 363/123 |
| 2006/0250823 | A1 * | 11/2006 | Murata et al. ........... 363/18 |
| 2007/0274106 | A1 * | 11/2007 | Coulson et al. ....... 363/21.12 |
| 2009/0021968 | A1 * | 1/2009 | Komatsu et al. ........ 363/126 |

FOREIGN PATENT DOCUMENTS

| JP | 2001-25245 A | 1/2001 |
| WO | WO 2004/082119 A2 | 9/2004 |

OTHER PUBLICATIONS

International Search Report dated May 1, 2007 issued in priority International Application No. PCT/JP2007/051365.

* cited by examiner

*Primary Examiner* — Jeffrey Sterrett
(74) *Attorney, Agent, or Firm* — Holtz, Holtz, Goodman & Chick, PC

(57) ABSTRACT

Disclosed a switching power supply apparatus which includes a voltage converting transformer including an auxiliary winding on a primary side and a switching control circuit, wherein the switching control circuit includes a detection circuit to detect a falling edge of a terminal voltage of the auxiliary winding, and controls a switching transistor connected to a primary winding of the transformer based on the terminal voltage of the auxiliary winding at the time immediately before current flowing through a secondary rectifier diode of the switching power supply apparatus becomes zero, which terminal voltage is obtained based on a detection timing of the detection circuit.

24 Claims, 12 Drawing Sheets

SWITCHING POWER SUPPLY CONTROL SEMICONDUCTOR INTEGRATED CIRCUIT SAMPLING AN AUXILIARY WIRING VOLTAGE NEAR A POINT AT WHICH A SECONDARY RECTIFIER DIODE CURRENT BECOMES ZERO

This application is a U.S. National Phase Application under 35 USC 371 of International Application PCT/JP2007/051365 filed Jan. 29, 2007.

TECHNICAL FIELD

The present invention relates to a technique for stabilization of an output voltage of a switching power supply apparatus including a voltage converting transformer, which is effective, for example, when it is applied to a DC-DC converter used in a power supply converting apparatus such as an AC adapter.

BACKGROUND OF THE INVENTION

An AC adapter is composed of a diode bridge circuit to rectify an alternating-current power supply, a DC-DC converter to lower a direct-current voltage rectified in the circuit to convert it into direct-current voltage of desired potential, and the like. As the DC-DC converter, for example, a switching power supply apparatus, in which current flowing through a primary winding of the voltage converting transformer is switching-controlled so that a voltage induced in a secondary winding is controlled, has been used.

Since miniaturization and low-cost production of the AC adapter have been pursued, it is important to reduce the number of mounting parts. For this reason, a control IC to control a switching transistor which applies current to the primary winding has been developed. Since a conventional switching control IC includes a relatively large number of outside elements such as a photo-coupler for feedback of an output voltage of the secondary winding to the control IC, capacitance and resistance, a circuit design for making the outside elements be incorporated in inside of the IC, and for reducing the number of the outside elements has been performed.

For example, as the invention relating to a switching regulator which need not have a photo-coupler or a secondary control IC, there is the invention disclosed in International publication number WO2004-082119 (Patent Document 1). FIG. 5 shows an entire configuration of the switching regulator disclosed in Patent Document 1, FIG. 6 shows a configuration example of a trigger control circuit which detects a terminal voltage of a primary auxiliary winding to provide a sampling timing, and FIG. 7 shows wave patterns of a signal and a voltage of inside of the regulator. Incidentally, the trigger circuit of FIG. 6 is placed in inside of the control IC 100 of FIG. 5.

In the switching regulator disclosed in Patent Document 1, as shown in FIG. 6, a change of a terminal voltage (hereinafter referred to as an auxiliary winding voltage) Vb of an auxiliary winding Nb is detected by comparators CP1, CP2 to generate signals Vg, Vd to control switches S1-S4 which charge and discharge capacitances C1, C2 are generated by a logic circuit including flip-flops FF1, FF2 and logic gates LG1, LG2 based on the signals Vg, Vd, and a timing when voltages of capacitances C1, C2 become equal is detected to generate sample hold signals S&H at the timing. The timing for generating the sample hold signals S&H is, as shown in FIG. 7, at a point Ps of two-thirds of voltage duration time Th of the auxiliary winding voltage Vb, and since the timing is near a point at which current Id flowing through a secondary diode or the secondary winding becomes zero, relatively high accuracy controlling can be performed.

DISCLOSURE OF THE INVENTION

Problem to be Solved by the Invention

However, as shown in FIG. 8, current Id flowing from a secondary winding Ns to a rectifier diode Dr changes so as to reduce gradually during the voltage duration time Th of the auxiliary winding voltage Vb. Therefore, although the point Ps of two-thirds of voltage duration time Th of the auxiliary winding voltage Vb is near the point at which current flowing through the diode becomes zero, the point Ps is not a point at which the current becomes zero perfectly. Additionally, the diodes have relatively large device characteristics variation.

As a result, if the voltage is sampled at a point at which the current flowing through the diode is not zero, it is difficult to detect accurate voltage, and a detection accuracy becomes poor because the sampled voltage becomes susceptible to the effect of the device characteristics variation of the diodes. Specifically, an output voltage Vout in the switching regulator of FIG. 5 is represented by following expression (1), when a winding ratio between the secondary winding and the primary auxiliary winding is Ns/Nb, and a forward voltage of the rectifier diode Dr on the secondary side is VF.

$$Vout = Vb(Ns/Nb) - VF \quad (1)$$

According to expression (1), it can be understood that the output voltage Vout varies due to a variation of the forward voltage VF of the diode. Moreover, according to expression (1), it can be understood that the sampled voltage is not affected by the device characteristics variation of the diodes when the auxiliary winding voltage Vb is sampled at the timing of when VF becomes zero, that is, when current flowing through the diode becomes zero.

Moreover, since the switching regulator disclosed in Patent Document 1 adopts a system in which the point of about two-thirds of voltage duration time Th of the auxiliary winding voltage Vb varies depending on conditions such as a load, and sampling in next cycle is performed at a sampling point determined based on a detection result in previous cycle, there is a problem that relative points vary when the output voltage varies due to variation of a load so that it becomes difficult to detect accurate voltage.

An object of the present invention is to provide a switching power supply apparatus including a voltage converting transformer, in which a terminal voltage of a auxiliary winding can be sampled at the timing very near a point at which current flowing through a rectifier diode on secondary side becomes zero, whereby high accuracy controlling of the output voltage can be performed.

The other object of the present invention is to provide a switching power supply apparatus which can perform an accurate sampling with few errors even when the output voltage varies, whereby high accuracy controlling of the output voltage can be performed.

Means for Solving Problems

In order to achieve the above objects, the present invention includes: a voltage converting transformer including an auxiliary winding on a primary side; a switching transistor connected to a primary winding of the transformer; a switching control circuit to receive a terminal voltage of the auxiliary winding to output a signal for controlling the switching transistor to be turned on/off; a rectifier diode connected to a secondary winding of the transformer; and an output smoothing condenser placed on the secondary side of the transformer, wherein the switching control circuit includes a detection circuit to detect a falling edge of the terminal voltage of the auxiliary winding, and the switching transistor is controlled based on the terminal voltage of the auxiliary winding at the time immediately before current flowing through the rectifier diode becomes zero, which terminal voltage is obtained based on a detection timing of the detection circuit.

Here, the detection section includes a differentiating circuit, and is configured to detect a falling edge of the terminal voltage of the auxiliary winding by the differentiating circuit. Moreover, a hold section to hold the terminal voltage of the auxiliary winding at the time immediately before a falling edge thereof and a sample hold circuit to perform sampling of the voltage held by the hold section based on a detection output of the detection circuit are provided, and the sample hold circuit is configured to include: a first sample hold circuit to perform sampling of a voltage depending on the terminal voltage of the auxiliary winding based on an oscillation signal of a predetermined frequency; and a second sample hold circuit to perform sampling of the voltage held by the first sample hold circuit based on a detection output of the detection circuit.

Furthermore, the second sample hold circuit includes: a first sample hold section to perform sampling the held voltage of the first sample hold circuit; and a second sample hold section to perform sampling of the held voltage of the first sample hold circuit, and the first sample hold section and the second sample hold section are configured to perform sampling of the voltage held by the first sample hold circuit alternately in every period based on a detection output of the detection circuit.

According to the above configuration, the terminal voltage of the auxiliary winding can be sampled at the timing immediately before current flowing through the rectifier diode on the secondary side becomes zero. Moreover, even when an output voltage is fluctuating, an accurate sampling with few errors can be performed. As a result, it becomes possible to detect an accurate voltage which is not influenced by a forward voltage of the secondary diode or by a characteristic variation of elements.

EFFECT OF THE INVENTION

According to the present invention, in the switching power supply apparatus including the voltage converting transformer, the terminal voltage of the auxiliary winding can be sampled at the timing extremely near the point at which current flowing through the rectifier diode on the secondary side becomes zero, thereby the advantages are achieved that high-accuracy output voltage control can be performed, and that low-cost production of a power supply apparatus can be realized since only few outside parts such as a photo-coupler for feeding back an output voltage are necessary.

DESCRIPTION OF MARKS

| | |
|---|---|
| 10 | switching power supply apparatus |
| 11 | diode bridge circuit |
| 12 | switching control circuit |
| 12A | falling edge detection circuit |
| 12B | first stage sample hold circuit |
| 12C | second stage sample hold circuit |
| 12D | signal switching section |
| 12E | error amplifier circuit |
| 12F | driving pulse generation section |

BEST MODE TO CARRY OUT THE INVENTION

An embodiment of the present invention will be described below with reference to the drawings.

Embodiment 1

Figure 1:
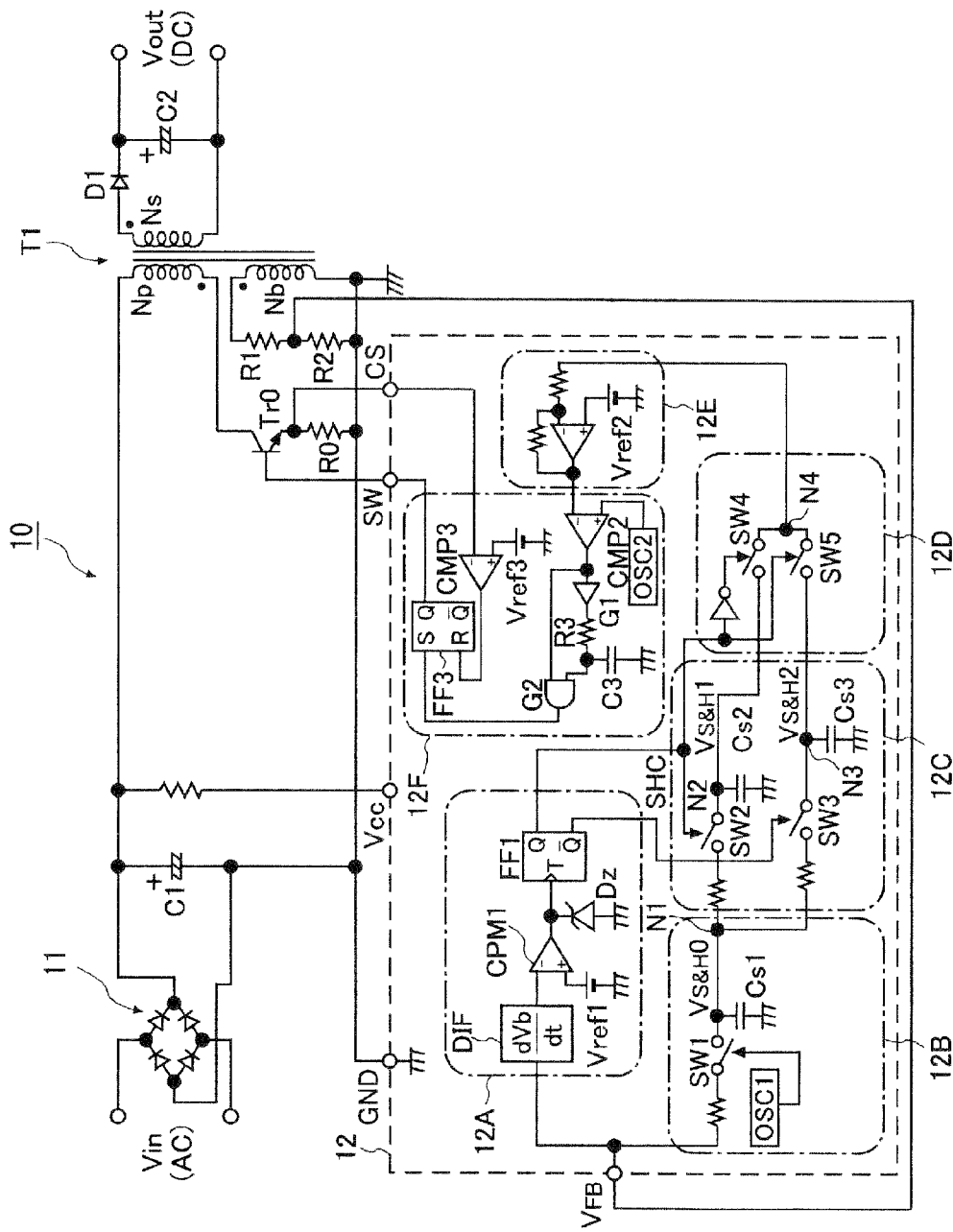
FIG. 1 is a circuit view showing a configuration of a switching power supply apparatus according to a first embodiment of the present invention.

FIG. 1 is a circuit view showing a configuration of a switching power supply apparatus according to the first embodiment of the present invention.

A switching power apply apparatus 10 according to this embodiment includes: a diode bridge circuit to rectify an alternating voltage (AC) to convert it into a direct voltage, and a smoothing condenser C1; a transformer T1 including a primary winding Np, an auxiliary winding Nb, and a secondary winding Ns; a switching transistor Tr0 connected to the primary winding Np of the transformer T1 in series; resistances R1, R2 to divide a terminal voltage of the auxiliary winding Nb; a switching control circuit 12 to drive the switching transistor Tr0 depending on a feedback voltage VFB divided by resistances R1, R2. The switching control circuit 12 is, though is not particularly limited to the below, formed on one semiconductor chip such as single-crystal silicon substrate as a semiconductor integrated circuit.

A rectifier diode D1 connected to the secondary winding Ns in series and a smoothing condenser C2 connected between a cathode terminal of the rectifier diode D1 and the other terminal of the secondary winding Ns are placed in a secondary side of the transformer T1, and they rectify and smooth alternating current induced in the secondary winding Ns by intermittently applying current to the primary winding Np so as to output a direct voltage Vout depending on a winding ratio between the primary winding Np and the secondary winding Ns.

The switching control circuit 12 includes: a falling edge detection section 12A to detect a falling edge of the auxiliary winding voltage Vb by monitoring the feedback voltage VFB; a first stage sample hold section 12B to sample the feedback voltage VFB in a predetermined period; a second stage sample hold section 12C including two sampling circuits to sample the sampled voltage alternately in every period; a signal switching section 12D to select the voltage of the sampling circuit in a HOLD status among the two sampling circuits to output the voltage as an error signal; an error amplifier circuit 12E to amplify a potential difference between the error signal and a predetermined reference voltage Vref2; and a driving pulse generation section 12F to generate a switching pulse which turns on/off the switching transistor Tr0 depending on an output of the error amplifier circuit 12E.

The driving pulse generation section 12F includes: an oscillator OSC2 to generate a triangle wave of a predetermined frequency; a comparator CPM2 to compare an output of the oscillator OSC2 and an output of the error amplifier circuit 12E; an one shot pulse generation circuit to include an inverter G1, a CR time constant circuit including a resistance R3 and a capacitance C3, and an AND gate G2, and to detect a change of an output of the comparator CPM1 so as to generate a pulse; a flip-flop FF3 to be set by the generated pulse; and a comparator CPM3 to compare an emitter voltage of the switching transistor Tr0 with a predetermined reference voltage Vref3. An output of the comparator CPM3 is input into a reset terminal of the flip-flop FF3.

When the flip-flop FF3 is set by an output of the AND gate G2, the switching transistor Tr0 is turned on so that current flows through the primary winding Np, and when the flip-flop FF3 is reset by an output of the comparator CPM3, the switching transistor Tr0 is turned off so that current of the primary winding Np is interrupted. By repeating above operation, intermediate current flows through the primary winding Np. At this time, by controlling a driving pulse of the transistor Tr0 so that, when the feedback voltage VFB is low, a timing of when the switching transistor Tr0 shifts from an off-state to an on-state is accelerated to allow on-state time to be longer, and when the feedback voltage VFB is high, a timing of when the switching transistor Tr0 shifts from an off-state to an on-state is delayed to allow on-state time to be shorter, an output voltage Vout of a predetermined level is generated on the secondary side of the transformer T1. Since a configuration and an operation of the driving pulse generation section 12F is same as known techniques, detailed explanations about them are omitted.

The falling edge detection section 12A includes: a falling edge detection circuit DIF including a differentiating circuit to detect a falling edge of the feedback voltage VFB, namely a falling edge of the auxiliary winding voltage Vb, and the like; a comparator CMP1 to compare a detection signal of the differentiating circuit with a predetermined reference voltage Vref1; a toggle type flip-flop FF1 to invert an output by outputs of the comparator; and a zener diode Dz connected in a backward direction between a output terminal of the comparator CMP1 and a ground point. The diode Dz may be connected between the falling edge detection circuit DIF and the comparator CMP1.

The first stage sample hold section 12B includes: an oscillator OSC1; a switching element SW1 to be turned on/off by the oscillation signal; and a sampling capacitance Cs1 to take in the feedback voltage VFB during on-state time of the switching element SW1. In this embodiment, an oscillatory frequency (for example, 1 MHz) of the oscillator OSC1 is about ten times higher than an oscillatory frequency (for example, 100 kHz) of the oscillator OSC2 of the driving pulse generation section 12F, though it is not limited to the above. By making the oscillatory frequency of the oscillator OSC1 be preferably not less than five times higher, more preferably not less than ten times higher, furthermore preferably not less than twenty times higher than the oscillatory frequency of the oscillator OSC2, it becomes easy to sample the voltage at a point nearer the point at which current flowing through the diode becomes zero than the point of two-thirds of voltage duration time Th of the auxiliary winding voltage Vb.

The second stage sample hold section 12C includes switching elements SW2, SW3 connected to an output node N1 of the first stage sample hold section 12B; a sampling capacitance Cs2 to take in an output potential of the first stage sample hold section 12B during on-state time of the switching element SW2; and a sampling capacitance Cs3 to take in an output potential of the first stage sample hold section 12B during on-state time of the switching element SW3. The switching elements SW2, SW3 are, by outputs Q, $\overline{Q}$ of the flip-flop FF1 of the falling edge detection section 12A, turned on alternately in every time when a rising edge of a wave pattern is detected, and controlled to take in hold potentials of the first stage sample hold section 12B during on-state time of the switching elements SW2, SW3 alternately into the sampling capacitances Cs2, Cs3. $\overline{Q}$ is a reversed phase signal of Q.

The signal switching section 12D is composed of switching elements SW4, SW5 connected between the sampling capacitances Cs2, Cs3 and an output node N4. The switching element SW5 is operated to be turned on/off by an output Q of the flip-flop FF1 of the falling edge detection section 12A, and the switching element SW4 is operated to be turned on/off by an inversion signal of the output Q. In other words, the SW4 is turned on/off complementary to the SW2, and the SW5 is turned on/off complementary to the SW3. This allows the signal switching section 12D to alternately output the voltage at the time when the sampling capacitance Cs2 is in a HOLD status after taking in an output potential of the first stage sample hold section 12B, and the voltage at the time when the sampling capacitance Cs3 is in a HOLD status after taking in an output potential of the first stage sample hold section 12B.

Figure 2:
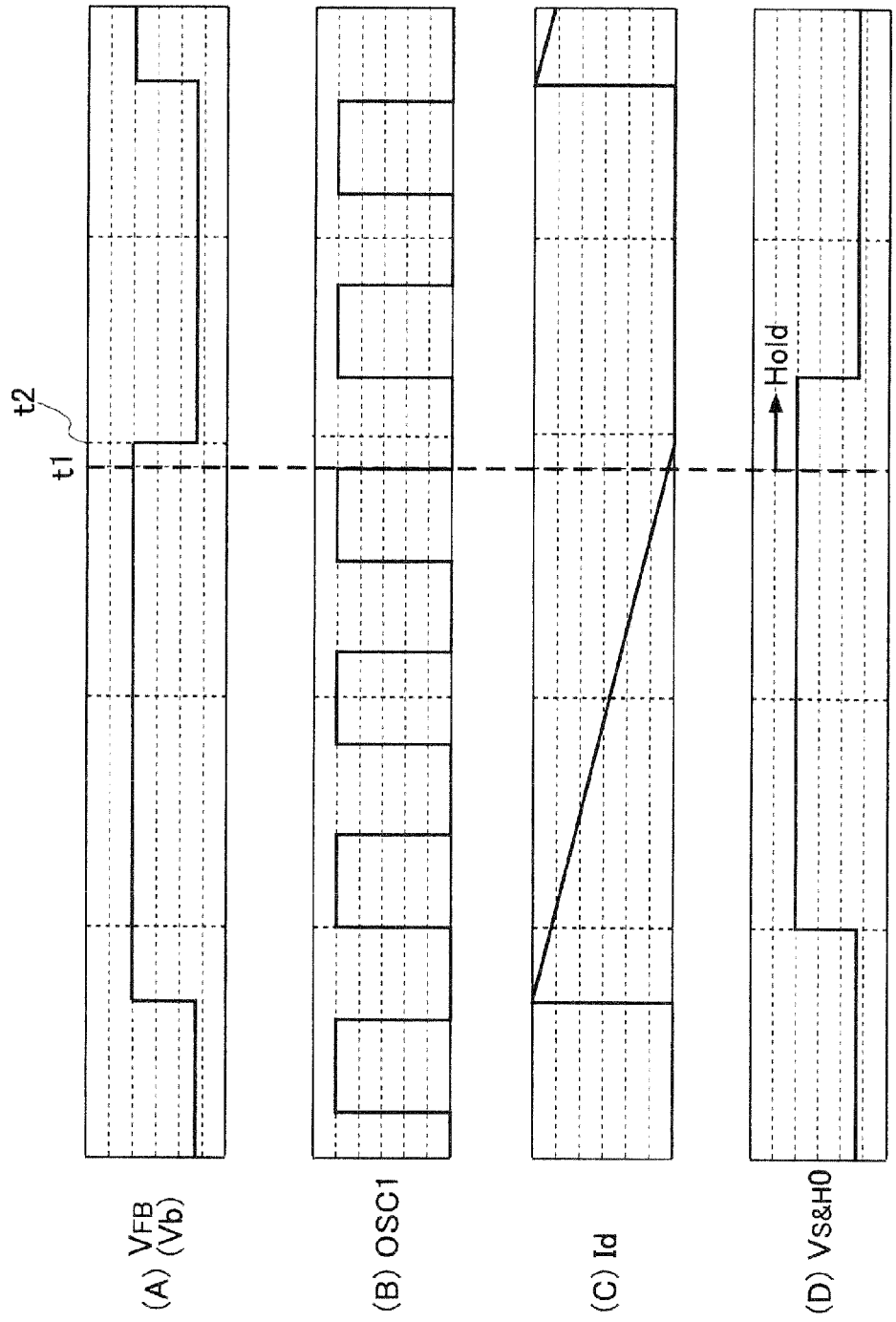
FIG. 2 is a time chart showing changes of signals and voltages in inside of the circuit of FIG. 1, which is an enlarged view of a part of a period of the time chart of FIG. 3.
Figure 3:
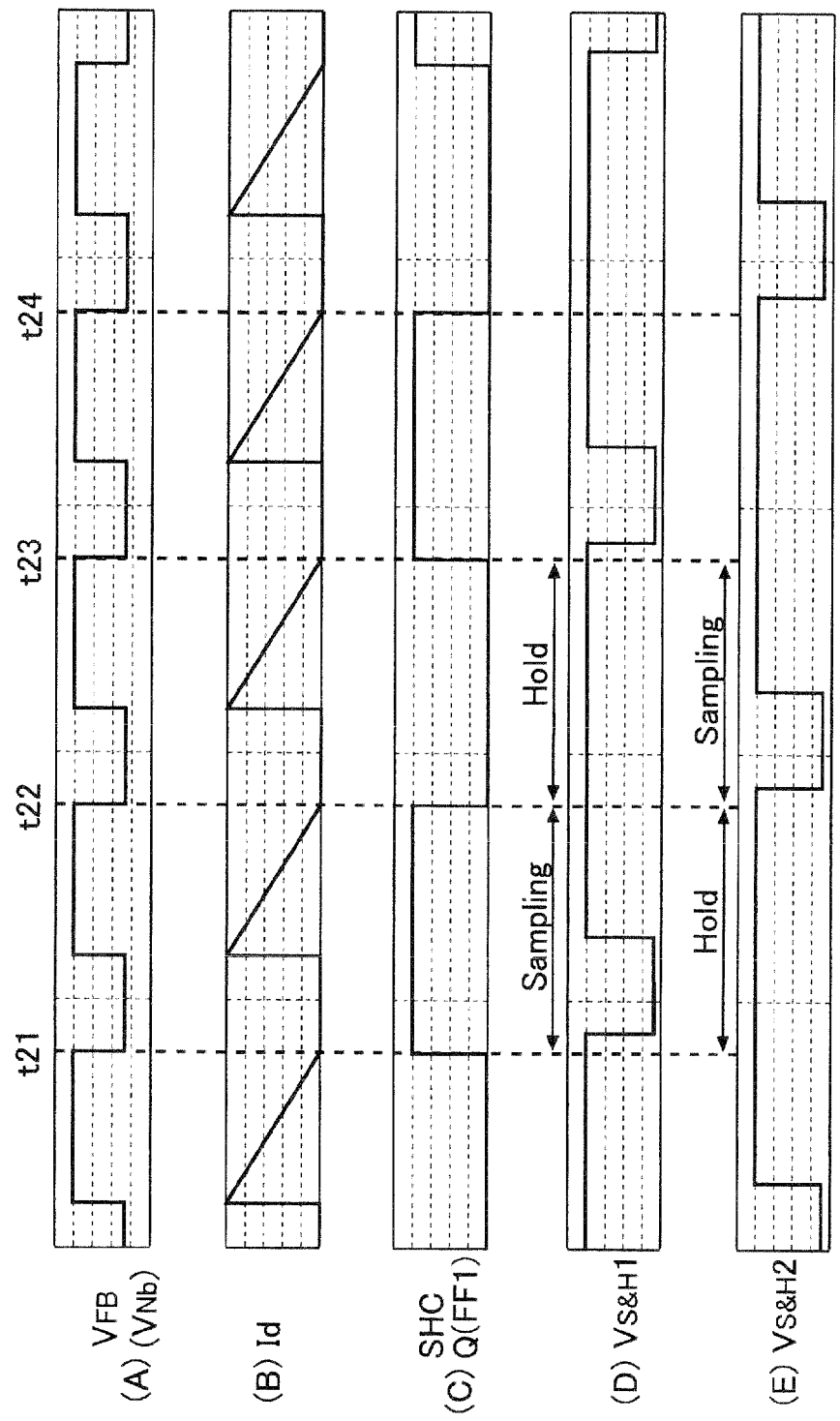
FIG. 3 is a time chart showing changes of signals and voltages in inside of the circuit of FIG. 1.

Next, an operation of a portion from the falling edge detection section 12A to the signal switching section 12D will be explained with reference to FIGS. 2 and 3. FIGS. 2 and 3 are time charts showing changes of signals and voltages in inside of the circuit of FIG. 1, and FIG. 2 is an enlarged view of a part of a period of the time chart of FIG. 3.

In FIG. 2, (A) shows the feedback voltage VFB, namely the auxiliary winding voltage Vb, (B) shows an output of the oscillator OSC1 in the first stage sample hold section 12B, (C) shows current Id flowing through the secondary diode D1, and (D) shows a sample hold signal Vs&H0 supplied from the first stage sample hold section 12B to the second stage sample hold section 12C.

Moreover, in FIG. 3, (A) is the feedback voltage VFB, namely the auxiliary winding voltage Vb, (B) is the current Id flowing through the secondary diode D1, (C) is the output Q of the flip-flop FF1 supplied from the falling edge detection section 12A to the second stage sample hold section 12C as a sampling/hold control signal SHC, and (D) and (E) are sample hold signals VS&H1, VS&H2 supplied from the second stage sample hold section 12C to the signal switching section 12D. Incidentally, in FIGS. 2 and 3, the auxiliary winding voltage Vb is illustrated simplistically.

In the switching control circuit 12 according to the embodiment of FIG. 1, as shown in FIG. 2, the switching element SW1 in the first stage sample hold section 12B is turned off at a falling timing t1 of an output of the oscillation OSC1, and then immediate preceding voltage of the sampling capacitance Cs1 is held. The timing t1 is immediately before a timing t2 of when the auxiliary winding voltage Vb rises and the current Id flowing through the secondary diode D1 becomes zero at the same time. The switching element SW1 is preferably composed of a transmission gate in which a P-channel MOSFET and an N-channel MOSFET are connected in parallel, when a MOSFET is used as a transistor configuring the switching control circuit 12, in other words, when the switching control circuit 12 is formed as a CMOS integrated circuit, in order to avoid a reduction of voltage to be transmitted.

The held voltage of the sampling capacitance Cs1 is alternately sampled and held by the sampling capacitances Cs2, Cs3 by turning on/off alternately the switching elements SW2, SW3 of the second stage sample hold section 12C at timings t21, t22 . . . (see FIG. 3) of when the output Q of the flip-flop FF1 of the falling edge detection section 12A, namely the sampling/hold control signal SHC changes, and then, the voltage is supplied to the error amplifier circuit 12E by the signal switching section 12D during a period of the HOLD status.

Preferably, the voltage Vb at the timing of falling edge of the auxiliary winding voltage Vb should be sampled and supplied to the error amplifier circuit 12E, but, if a falling edge of the auxiliary winding voltage Vb is detected by the differentiating circuit and made to be a sampling timing, a sampling operation is delayed because of circuit delay, and sampling can not performed at the timing of when the current Id flowing through the secondary diode D1 becomes zero. Therefore, in the switching regulator according to this embodiment, since a delayed occurs by sampling the auxiliary winding voltage Vb by the output of the oscillator OSC1 in the first stage sample hold section 12B, and it is sampled in the second stage sample hold section 12C at the time of when a falling edge of the auxiliary winding voltage Vb is detected, it is possible to perform sampling without a specific time delay even if a sampling signal SHC is delayed.

Embodiment 2

Figure 4:
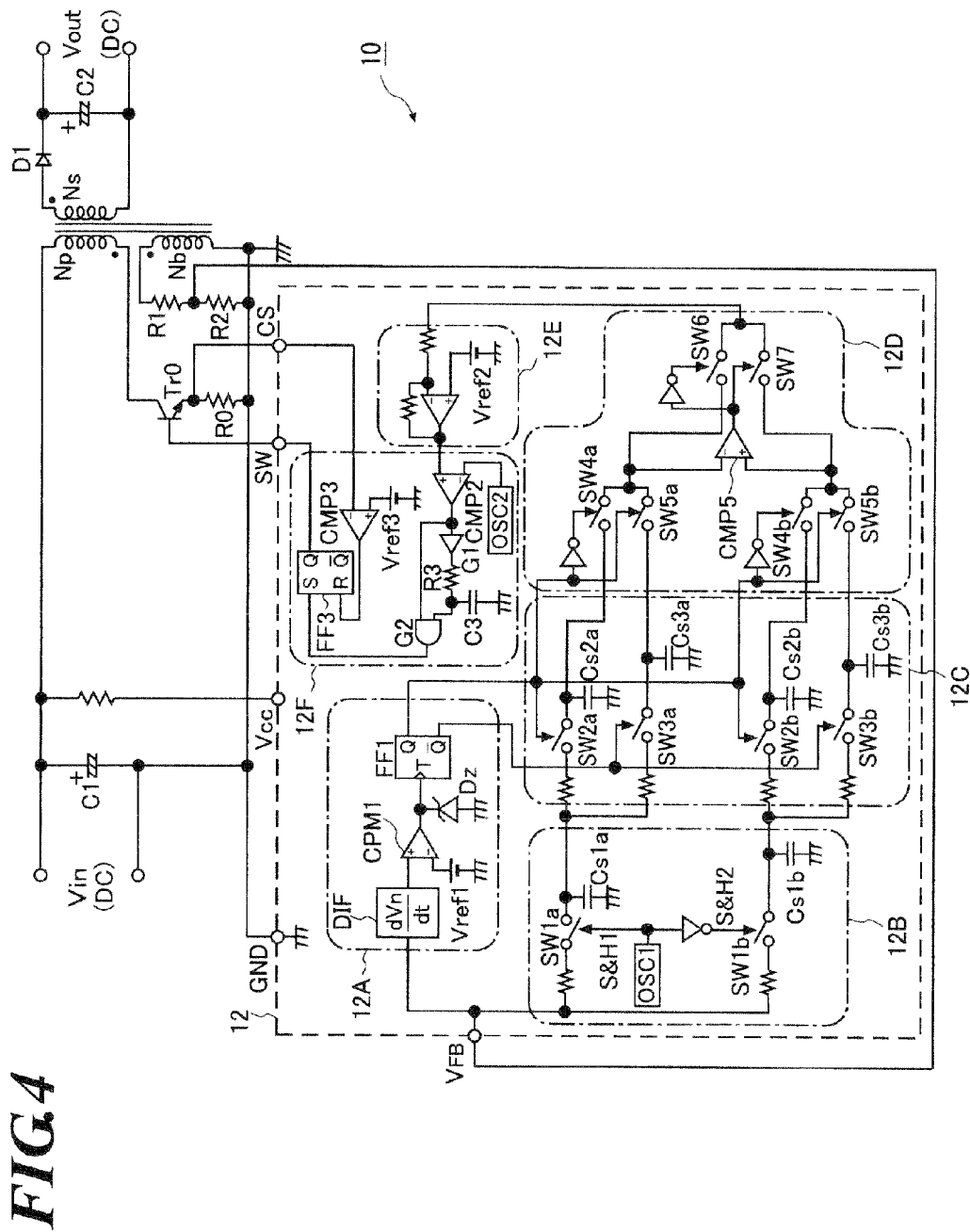
FIG. 4 is a circuit view showing a switching power supply apparatus according to a second embodiment of the present invention.
Figure 5:
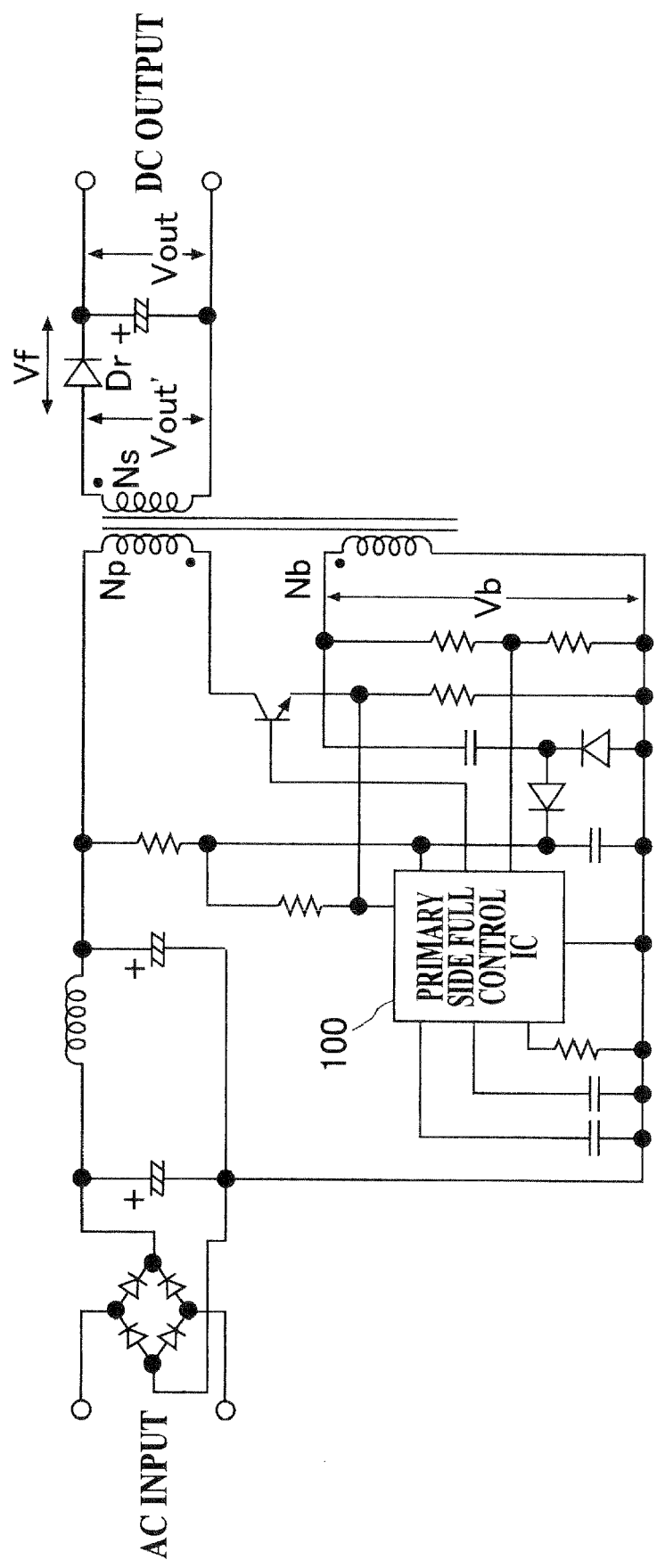
FIG. 5 is a circuit view showing an entire configuration of a switching regulator disclosed in Patent Document 1.
Figure 6:
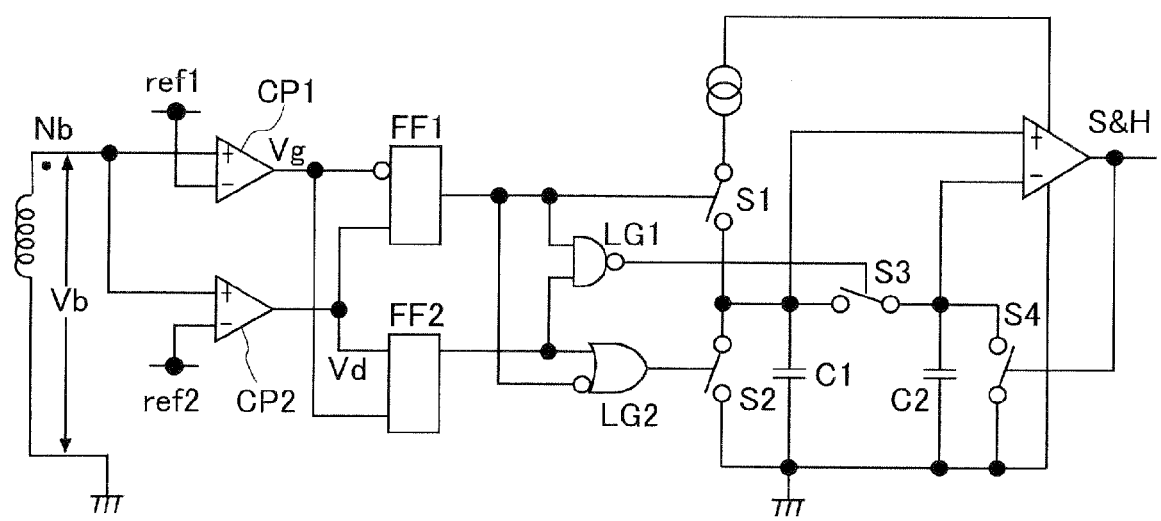
FIG. 6 is a circuit view showing a configuration example of a trigger control circuit which detects a terminal voltage of a primary auxiliary winding to provide a sampling timing in the circuit of FIG. 5.
Figure 7:
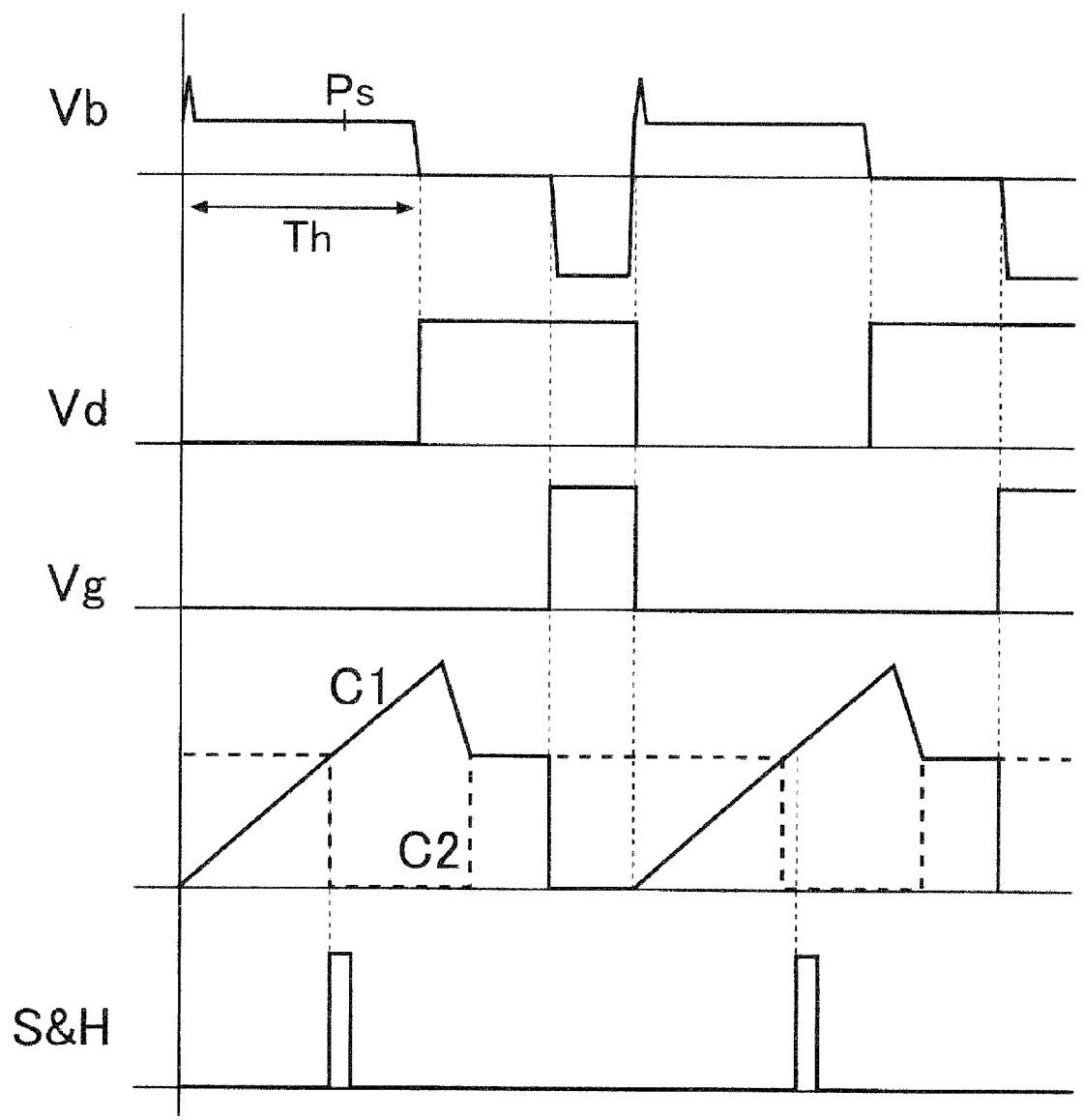
FIG. 7 is a time chart showing changes of signals and voltages in inside of the regulator of FIG. 5.
Figure 8:
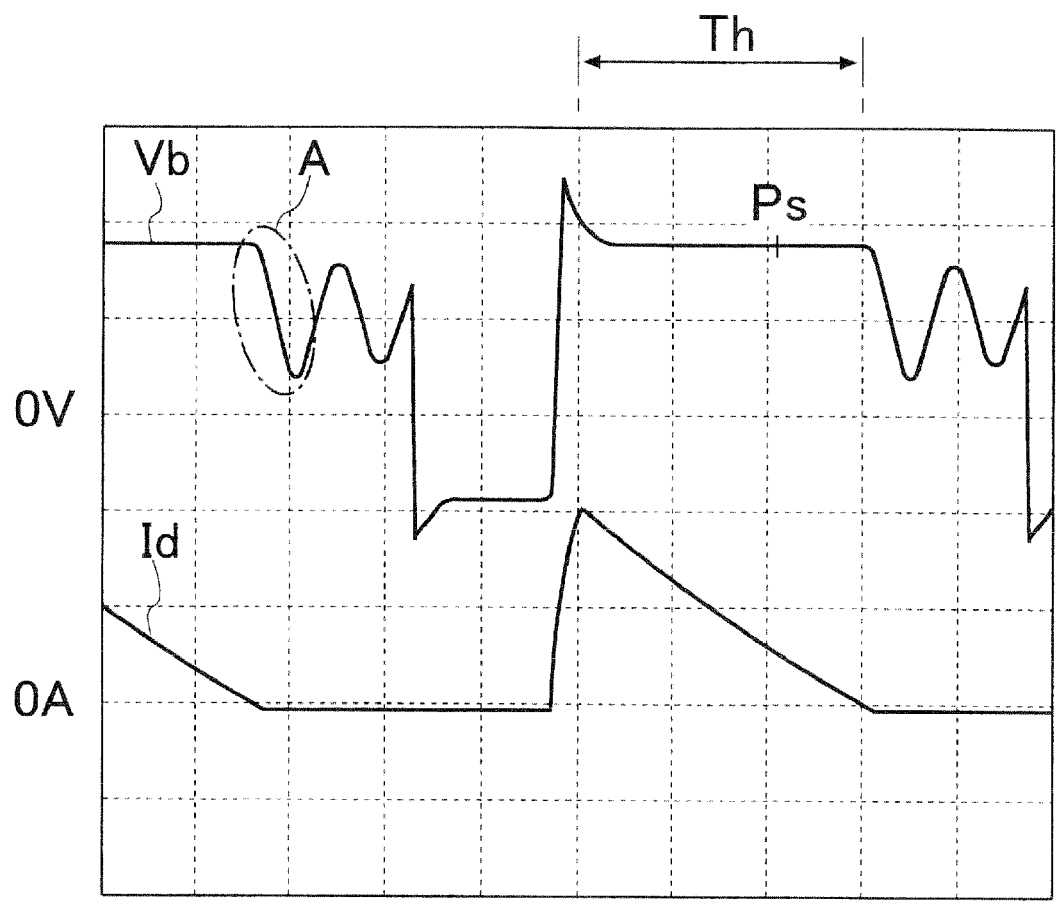
FIG. 8 is a time chart showing changes of auxiliary winding voltage in the regulator, and changes of current in a secondary diode, in FIG. 5.

FIG. 4 is a circuit view showing a configuration of a switching power supply apparatus according to a second embodiment of the present invention.

The switching power supply apparatus 10 according to this embodiment has a configuration in which the diode bridge circuit is omitted so that direct current is input directly, and two systems each including the first stage sample hold section 12B, the second stage sample hold section 12C, and the signal switching section 12D are provided.

In the embodiment of FIG. 1, when a voltage of the feedback voltage VFB is changed, a conduction ratio of the switching element SW1 is also changed. It is thereby possible that the feedback voltage VFB can not be delayed by the OSC1, in other words, the auxiliary winding voltage value at the time immediately before a falling edge of the VFB can not be held. In other words, the voltage value during the auxiliary winding voltage is in the middle of falling or the voltage value after the auxiliary winding voltage has been fallen can be held. Therefore, this embodiment provides the two systems each including the first stage sample hold sections 12B, the second stage sample hold sections 12C, and the signal switching sections 12D, allows one of the two systems to be operated by a normal phase signal of OSC1, and allows the other of the two systems to be operated by a reversed phase signal of OSC1. As a result, even if one (SW2a, Cs2a, SW3a, Cs3a) of the sample hold circuits of the second stage sample hold section 12C can not hold a desired voltage value, it becomes possible that the other (SW2b, Cs2b, SW3b, Cs3b) of the sample hold circuits of the second stage sample hold section 12C can hold a desired voltage value.

Furthermore, the signal switching section 12D includes: switching elements SW4a, SW5a and SW4b, SW5b to select the voltage held in the two systems; a comparator CMP5 to compare the held voltages of the two systems; and switching elements SW6, SW7 to select, by the output, which of the voltages sampled in the two systems is allowed to be an input signal of the error amplifier circuit 12E at a latter part. Since the voltage value of the system which can be holding the voltage value at the time immediately before a falling edge of the auxiliary winding voltage is higher, the mechanism is provided that the comparator CPM5 judges above status so as to switch the switching elements SW6, SW7. As a result, it is possible to hold the value at the time immediately before a falling edge (secondary diode current) of the auxiliary winding voltage becomes zero, thereby an accurate constant voltage control can be realized by performing feed back control based on the value.

Incidentally, in the above embodiment, though the sample hold section 12B which performs sampling of the feedback voltage (auxiliary winding voltage) by a predetermined oscillation signal is provided in former stage than the sample hold section 12C, it is not limited to the above, and can be configured by any means for holding voltage wave patterns at the time immediately before a falling edge of the auxiliary winding voltage, such as a holding circuit constructed with a cascade connection of buffer amplifiers. Moreover, in the above embodiment, though the voltage obtained by dividing the auxiliary winding voltage Vb by resistances is the feedback voltage, the auxiliary winding voltage Vb can be the feedback voltage without change.

Moreover, in the first embodiment, though the sample hold section 12B and the driving pulse generation section 12F have oscillators OSC1, OSC2 respectively, a frequency divider can be provided instead of the oscillator OSC2 so that a signal generated in the oscillator OSC1 is divided to be used. Moreover, in the first and second embodiments, though the switching transistor Tr0 is composed of an outside element, an on-chip element formed on the semiconductor chip on which the switching control circuit 12 is formed can be used.

Embodiment 3

Next, a third embodiment of the switching power supply apparatus according to the present invention will be described. In the switching power supply apparatus according to the second embodiment, the sampling switching elements SW1*a*, SW1*b* of the first stage sample hold section 12B performs alternately sampling and holding operations by using an output of the oscillator OSC1 and an inverted signal of the output (each duty ratio is 50%) as a signal for performing on/off control of the switching elements SW1*a*, SW1*b*.

In the above case, since a pulse width of the sample hold control signal is relatively broad, when a hold timing comes by falling of a control signal in a period from the auxiliary winding voltage Vb starts falling until the detection signal of the falling edge detection section 12A is generated, a voltage in the middle of falling and changing drastically is held, thereby a stable output voltage control becomes difficult. An object of the third embodiment is to prevent above problems and to make it possible to achieve a stable output voltage control. The third embodiment will be described below with reference to FIG. 9.

Figure 9:
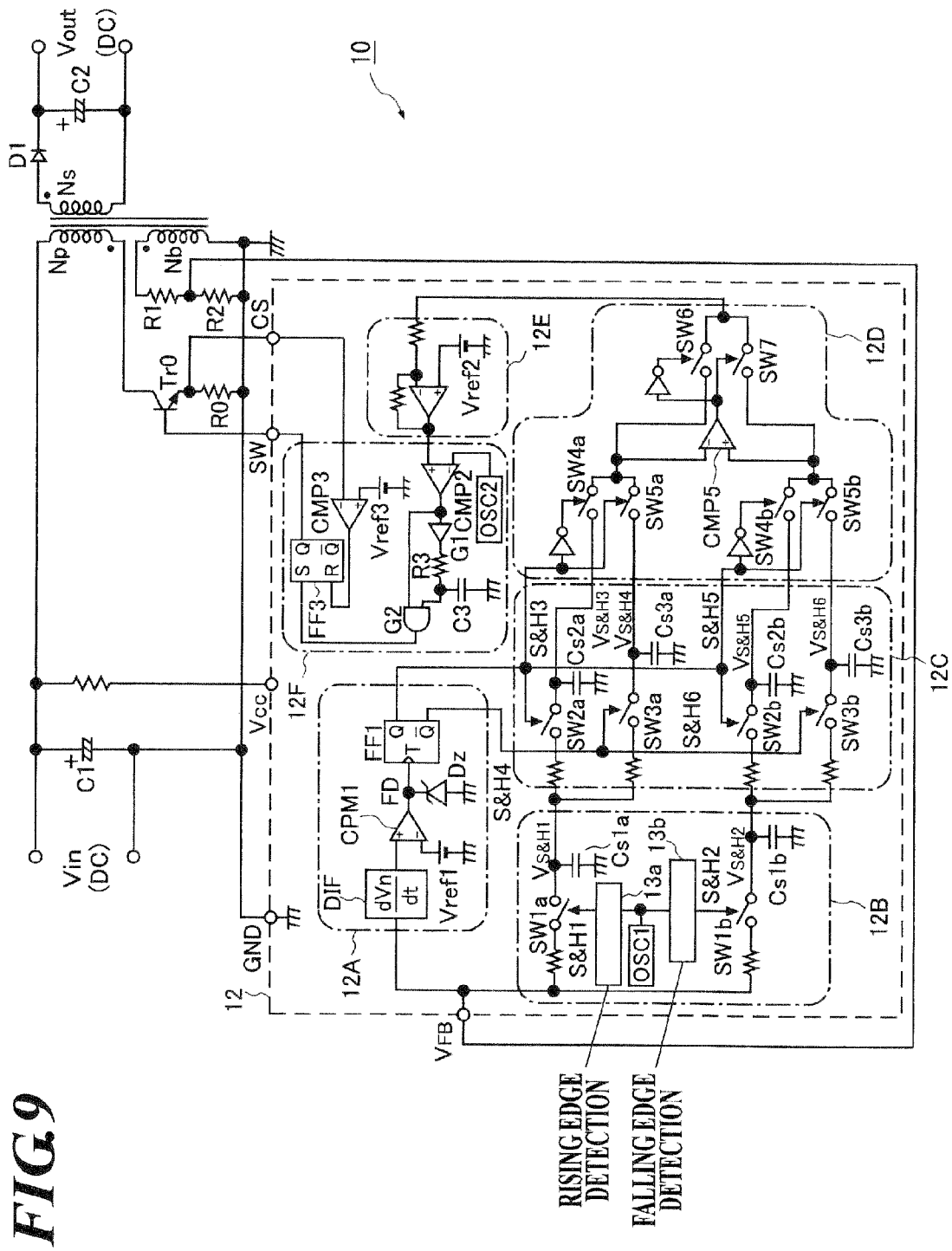
FIG. 9 is a circuit view showing a configuration of a switching power supply apparatus according to a third embodiment.

FIG. 9 is a circuit view showing a configuration of a switching power supply apparatus according to a third embodiment. The switching power supply apparatus of this embodiment has almost same configuration as that of the switching power supply apparatus of the second embodiment of FIG. 4. The difference from the switching power supply apparatus of the second embodiment of FIG. 4 is that a rising edge detection circuit 13*a* to detect a rising edge of an output of the OSC1 and a falling edge detection circuit 13*b* to detect a falling edge of an output of the OSC1 are provided in the circuit which generates the sampling signals S&H1, S&H2 for on/off controlling of the sampling switching elements SW1*a*, SW1*b* of the first stage sample hold section 12B, instead of using an output of the OSC1. The sampling signal generation circuit is not limited to the rising edge detection circuit 13*a* and the falling edge detection circuit 13*b* as long as it generates a signal which meets a requirement to be explained below.

Figure 10:
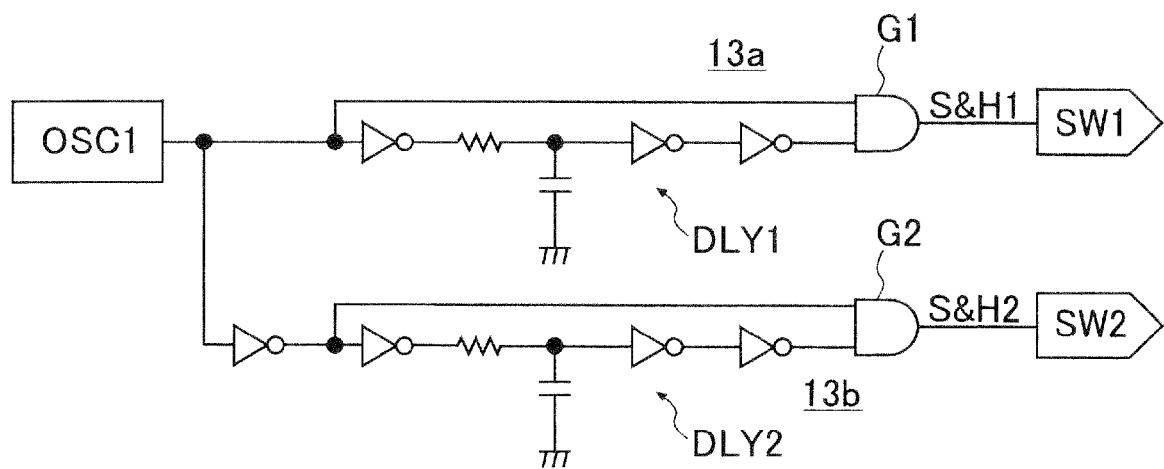
FIG. 10 is a circuit configuration view showing specific circuit examples of an oscillation signal rising edge detection circuit and an oscillation signal falling edge detection circuit.

FIG. 10 shows specific circuit examples of the rising edge detection circuit 13*a* and the falling edge detection circuit 13*b*.

In this embodiment, the rising edge detection section 13*a* includes: a delay circuit DLY1 to delay an output of the oscillator OSC1, in which odd number of inverters and an RC time constant circuit are connected in series; and an AND gate circuit G1 to receive an output of the oscillator OSC1 and a delayed signal of the delay circuit DKY1. The falling edge detection circuit 13*b* includes: a first stage inverter to invert an output of the oscillator OSC1; a delay circuit DLY2 in which odd number of inverters and an RC time constant circuit are connected in series; and an AND gate circuit G2 to receive an output of the first stage inverter and a delayed signal of the delay circuit DLY2.

The rising edge detection section 13*a* and the falling edge detection circuit 13*b* are one shot pulse generation circuits, and among them, the rising edge detection section 13*a* generates a rising edge detection signal having a pulse width synchronized with a rising edge of an output signal of the oscillator OSC1 and corresponding to delay time td1 of the delay circuit DLY1, as a sampling signal S&H1. The falling edge detection circuit 13*b* generates a falling edge detection signal having a pulse width synchronized with a falling edge of an output signal of the oscillator OSC1 and corresponding to delay time td2 of the delay circuit DLY2, as a sampling signal S&H2. The rising edge detection section 13*a* and the falling edge detection circuit 13*b* may be constructed as circuits the delay times of which are adjustable by using an outside element as a resistance or a capacitance in the delay circuits DLY1, DLY2 of the rising edge detection section 13*a* and the falling edge detection circuit 13*b*, or by allowing the resistance value and the capacitance value to be variable.

Figure 11:
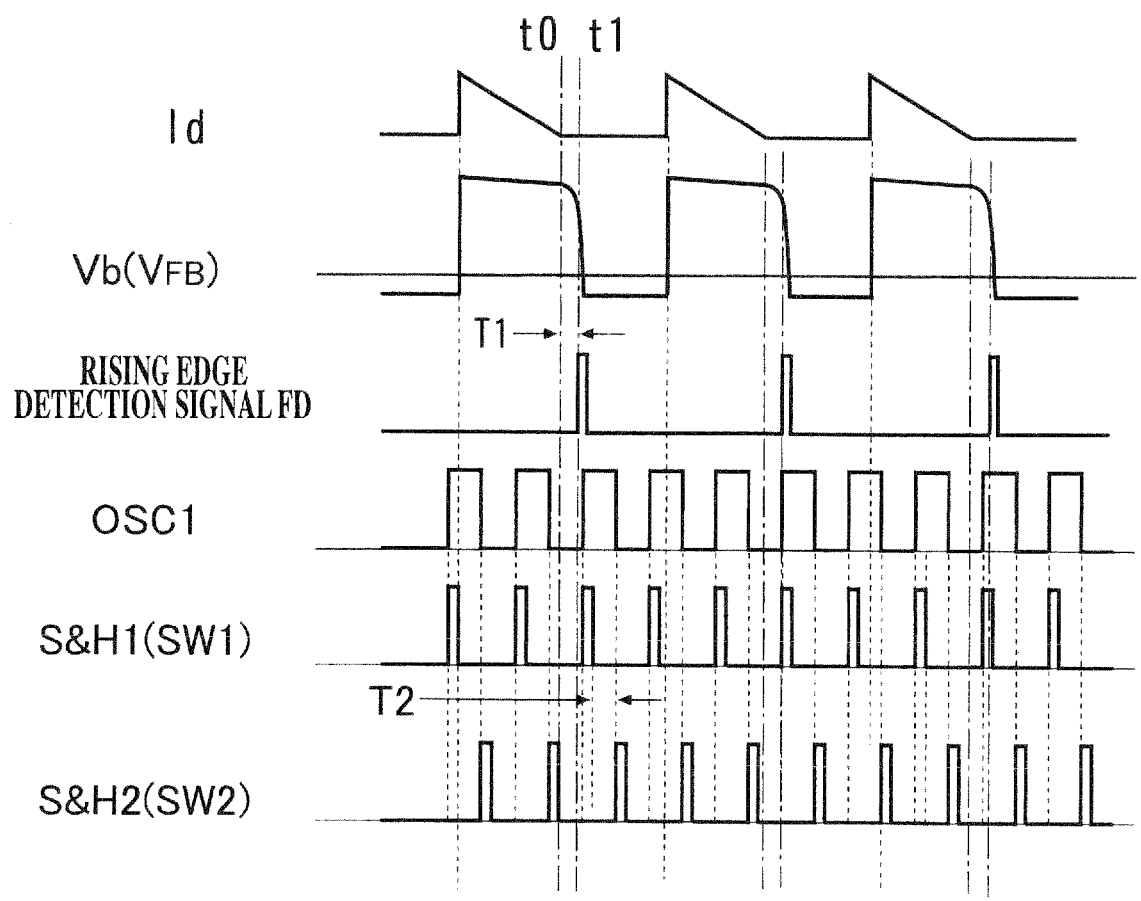
FIG. 11 is a time chart showing changes of auxiliary winding voltage Vb, a detection signal in a falling edge detection section, an output signal of an oscillator, and sampling signals S&H1, S&H2.

FIG. 11 shows the timing of changes of the auxiliary winding voltage Vb, a detection signal FD (an input signal of the FF1 of FIG. 9) of the falling edge detection section 12A, and the sampling signals S&H1, S&H2. In FIG. 11, a reference numeral t0 is the timing of when current flowing through the diode D1 becomes "zero". Since the oscillator OSC1 operates in asynchronization with the oscillator OSC2, a phase of an output wave pattern of the oscillator OSC1 gradually shifts relative to a wave pattern of the auxiliary winding voltage Vb. FIG. 11 shows a state in which the timing of a falling edge of the sampling signal S&H2 corresponds to the timing t0 of when current flowing through the diode D1 becomes "zero".

The inventors investigated details by running a simulation and the like, and realized that it is preferable to set the value of T2 to be T2>T1, where T1 is the time from the timing t0 of when current flowing through the diode D1 becomes "zero" to the timing t1 of when the detection signal FD of the falling edge detection section 12 A rises, and T2 is the time from a falling edge of the sampling signal S&H1 to a rising edge of the sampling signal S&H2. If T2 is set to be T2<T1 contrary to the above, the value of the auxiliary winding voltage Vb after current of the diode D1 becomes "zero" during the timing t0-t1 are sampled, and the auxiliary winding voltage Vb at the time immediately before current of the diode D1 becomes "zero" can not be sampled. Moreover, since the value of the auxiliary winding voltage after current of the diode D1 becomes "zero" falls sharply, if the value is tried to be sampled, the value which is largely lower than a desired value is sampled. Therefore, in this embodiment, T2 is set to be T2>T1.

Incidentally, T1 is set so as to prevent the falling edge detection section 12A from detecting a noise included in the auxiliary winding voltage Vb. T2 may be set by appropriately selecting a frequency of the oscillator OSC1 and the delay time td1 of the delay circuit DLY1. Specifically, the delay time td1 can be set to be a desired value by changing values of a resistance and a capacitance of the RC time constant circuit of the delay circuit DLY1.

Next, the reason why the third embodiment having the above configuration is preferable to the second embodiment using an output of the oscillator OSC1 as the sampling signal in the first stage sample hold section 12B.

Figure 12:
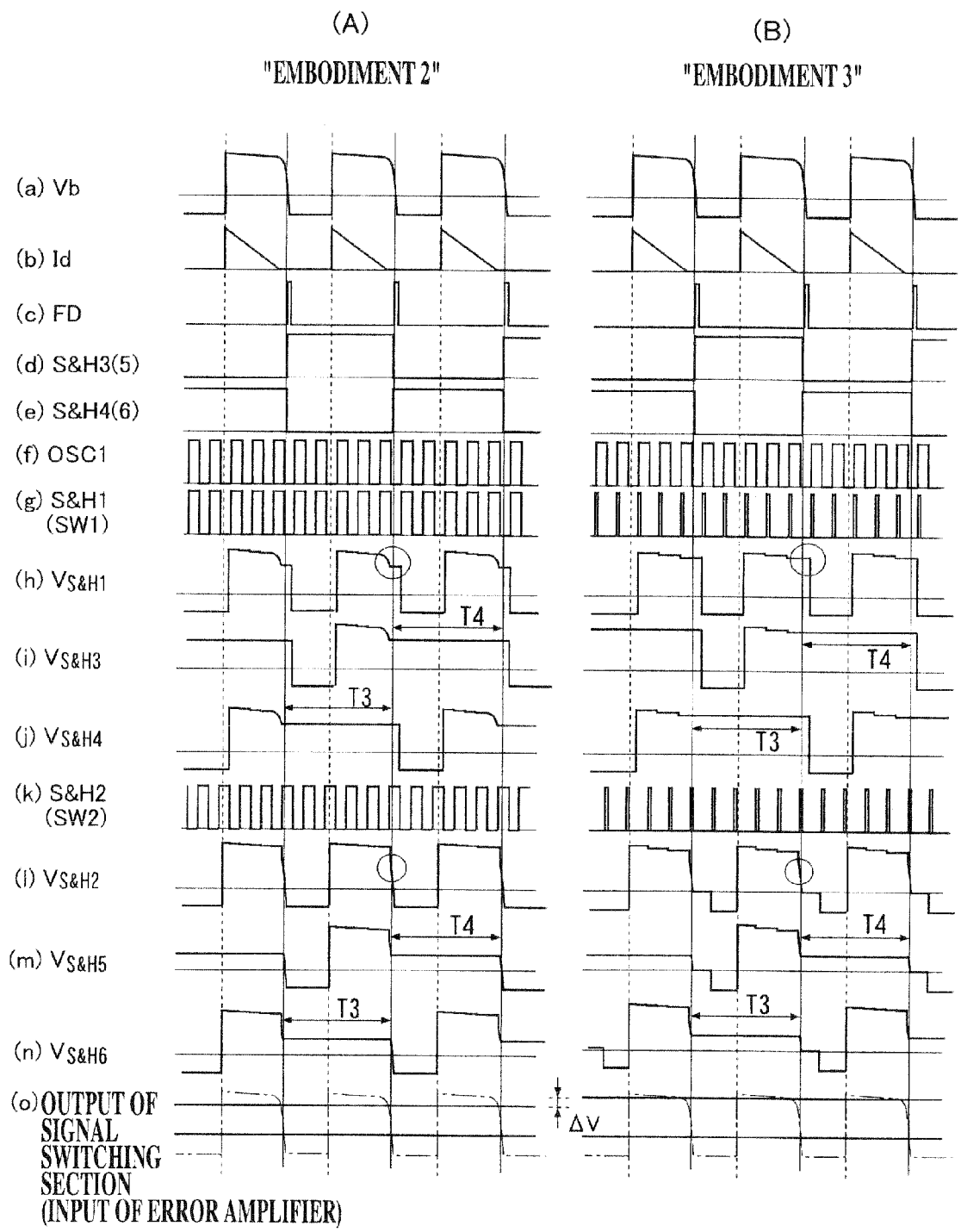
FIG. 12(A) is an example of changes of signals and voltages in each section of the switching power apply apparatus according to the second embodiment.
FIG. 12(B) is an example of changes of signals and voltages in each section of the switching power apply apparatus according to the third embodiment.

FIG. 12A shows an example of changes of signals and voltages in each section of the switching power apply apparatus according to the second embodiment, and FIG. 12B shows an example of changes of signals and voltages in each section of the switching power apply apparatus according to the third embodiment. In FIG. 12, (h) is the voltage VS&H1 to be sampled and held in the capacitance Cs1*a* by the sampling signal S&H1 of (g), (I) is the voltage VS&H2 to be sampled and held in the capacitance Cs1*b* by the sampling signal S&H2 of (k), the input voltage Vb is taken in the capacitances Cs1*a*, Cs1*b* during the high-level period of the S&H1, S&H2, and immediately preceding voltage is held during the low-level period of the S&H1, S&H2.

Furthermore, the voltage VS&H1 is sampled by the signals S&H3, S&H4 of (d), (e) so as to be the voltages VS&H3, VS&H4 of (i), (j), and the voltage VS&H2 is sampled by the signals S&H5, S&H6 of (d), (e) so as to be the voltages VS&H5, VS&H6 of (m), (n). The hold portions of the voltages VS&H3, VS&H4 are selected (extracted) by the switches SW4*a*, SW5*a* of the signal switching section 12D, the hold portions of the voltages VS&H5, VS&H6 are selected (extracted) by the switches SW4*b*, SW5*b* of the signal switching section 12D, and then, the voltages VS&H3, VS&H4 and the voltages VS&H5, VS&H6 are supplied to the comparator CPM5.

In the example of FIG. 12, the portion T3 of the voltage VS&H4 of (j), the portion T4 of the voltage VS&H3 of (i), the portion T3 of the voltage VS&H6 of (n), and the portion T4 of the voltage VS&H5 of (m) are supplied to the CMP5. By this, it can be understood that an approximately-constant voltage which does not drastically change is supplied to the CMP5 so that a stable judgment is realized. Then, the comparator CMP5 alternately compares the voltages VS&H3 and VS&H5, and the voltages VS&H4 and VS&H6, and the switches SW6, SW7 select a larger voltage to supply it to the error amplifier circuit 12E of a subsequent stage.

Here, the sampling signals S&H1, S&H2 are, in FIG. 12(A), as shown in (g), (k), an in-phase signal and a reversed phase signal which have duty ratios of 50% same as that of an output of the oscillator OSC1, and in FIG. 12(B), signals having narrow pulse widths in synchronous with an output of the oscillator OSC1 or a reversed phase signal thereof.

The problem in FIG. 12(A) is, when the voltage VS&H2 sampled and held by the signal S&H2 of (k) is sampled and held by the signals S&H5 and S&H6 of (d), (e), if these timings are overlapped, the voltage value of the voltage VS&H2 in the middle of falling could be held, as shown in (m) and (n).

On the other hand, in FIG. 12(B), since the signals S&H1, S&H2 of (g), (k) have narrow pulse widths and the circuit is designed so that T2>T1 as mentioned above, the timings of the signal S&H2 and the signals S&H5, S&H6 can be allowed to be overlapped as much as possible. As a result, it can be avoided to hold the voltage value of the voltage VS&H2 in the middle of falling.

In the case of FIG. 12, the comparator COM5 compares the voltage values of the voltage portions marked by circles in (g), (k) and selects the voltage of (h). In FIG. 12(A), in the case of seeing from the auxiliary winding voltage Vb, the voltage in the middle of falling is held. In FIG. 12(B), the voltage value at the time immediately before a falling edge can be held. Therefore, as shown in (o) of FIG. 12, a potential difference ∇V occurs between outputs of the signal switching sections, which is to be inputs of the error amplifier, of the second embodiment and the third embodiment.

The third embodiment can separate the voltage value of the auxiliary winding voltage sampled before a falling thereof from the voltage value sampled in the middle of falling or after falling, and adopt the voltage value sampled before falling as the feedback signal. As a result, the third embodiment can detect the voltage immediately before current of the diode becomes "zero" and the auxiliary winding voltage begins to fall, with higher accuracy than the second embodiment.

Incidentally, though the third embodiment also includes the oscillators OSC1, OSC2 in the first stage sample hold section 12B and the driving pulse generation section 12F respectively, a frequency divider can be provided instead of the oscillator OSC2 so that, for example, a signal obtained by dividing an oscillation signal supplied from outside is input into the rising edge detection section 13a and the falling edge detection section 13b to generate the sampling signals S&H1, S&H2.

Although the embodiments of the present invention have been explained as above, the detail composition of the first through third embodiments can be changed appropriately within the spirit of the present invention.

Moreover, the present invention can be applied not only to a separately-excited switching power supply apparatus but also a self-excited switching power supply apparatus.

The invention claimed is:

1. A switching power supply apparatus comprising:
    a voltage converting transformer including an auxiliary winding on a primary side and a switching control circuit,
    wherein the switching control circuit includes:
        a detection circuit which includes a differentiating circuit and which detects a falling edge of a terminal voltage of the auxiliary winding by the differentiating circuit, and controls a switching transistor connected to a primary winding of the transformer based on a result of sampling of the terminal voltage of the auxiliary winding, which sampling is performed at a time immediately before current flowing through a secondary rectifier diode of the switching power supply apparatus becomes zero based on a detection timing of the detection circuit.

2. The switching power supply apparatus according to claim 1, further comprising:
    a hold section which holds the terminal voltage of the auxiliary winding at the time immediately before the falling edge thereof; and
    a sample hold circuit which performs sampling of the voltage held by the hold section based on a detection output of the detection circuit.

3. The switching power supply apparatus according to claim 2, wherein:
    the hold section comprises a previous stage sample hold circuit which performs sampling of a voltage depending on the terminal voltage of the auxiliary winding based on an oscillation signal of a predetermined frequency,
    the previous stage sample hold circuit includes:
        a first sample hold section which performs sampling of a voltage depending on the terminal voltage of the auxiliary winding based on an oscillation signal of a predetermined frequency; and
        a second sample hold section which performs sampling of a voltage depending on the terminal voltage of the auxiliary winding based on a reversed phase signal of the oscillation signal,
    the sample hold circuit includes:
        third and fourth sample hold sections which perform sampling of the voltage held by the first sample hold section based on a detection output of the detection circuit; and
        fifth and sixth sample hold sections which perform sampling of the voltage held by the second sample hold section based on a detection output of the detection circuit, and
    the third and fourth sample hold sections perform sampling operations alternately in every period, the fifth and sixth sample hold sections perform sampling operations alternately in every period, and a higher voltage among the voltage held by the third or fourth sample hold section and the voltage held by the fifth or sixth sample hold section is selected as an output of the sample hold circuit.

4. The switching power supply apparatus according to claim 2, wherein the switching control circuit includes an internal oscillator, performs sampling and holding of the terminal voltage of the auxiliary winding of the switching power supply apparatus at a frequency of the internal oscillator, and controls the switching power supply apparatus based on a voltage value sampled and held in a last clock before the timing of the falling edge of the terminal voltage.

5. The switching power supply apparatus according to claim 4, wherein an oscillatory frequency of the internal oscillator is not less than five times a switching frequency of the switching power supply apparatus.

6. The switching power supply apparatus according to claim 5, wherein the sample hold circuit includes:
a first sample hold section which performs sampling of the voltage held in the hold section; and
a second sample hold section which performs sampling of the voltage held in the hold section, and
wherein the first sample hold section and the second sample hold section are configured to perform sampling of the voltage held in the hold section alternately in every period based on the detection output of the detection circuit.

7. The switching power supply apparatus according to claim 5, wherein the hold section comprises a previous stage sample hold circuit which performs sampling of a voltage depending on the terminal voltage of the auxiliary winding based on an oscillation signal of a predetermined frequency.

8. The switching power supply apparatus according to claim 5, wherein the switching control circuit further includes:
an error amplifier circuit which compares the voltage sampled by the sample hold circuit with a predetermined voltage to output a voltage depending on a potential difference; and
a signal switching circuit which alternately transmits the voltage sampled and held by the first sample hold section and the voltage sampled and held by the second sample hold section to the error amplifier circuit.

9. The switching power supply apparatus according to claim 8, wherein the switching control circuit further includes a signal generation circuit which generates a switching control signal depending on a voltage output from the error amplifier circuit, and
wherein the switching transistor is turned on/off by the switching control signal generated by the signal generation circuit to apply current to the primary winding of the transformer.

10. The switching power supply apparatus according to claim 1, wherein the detection circuit includes:
a voltage comparison circuit which compares an output of the differentiating circuit with a predetermined voltage; and
a flip-flop circuit, an output of which is inverted according to an output of the voltage comparison circuit.

11. The switching power supply apparatus according to claim 10, further comprising:
a first sample hold circuit which performs sampling of a voltage depending on the terminal voltage of the auxiliary winding based on an oscillation signal of a predetermined frequency; and
a second sample hold circuit which performs sampling of the voltage held in the first sample hold circuit based on the detection output of the detection circuit,
wherein the second sample hold circuit includes:
a first sample hold section which performs sampling of the held voltage of the first sample hold circuit; and
a second sample hold section which performs sampling of the held voltage of the first sample hold circuit, and
wherein the first sample hold section and the second sample hold section are configured to perform sampling of the voltage held by the first sample hold circuit alternately in every period according to a normal phase output and a reversed phase output of the flip-flop circuit.

12. The switching power supply apparatus according to claim 11, wherein the switching control circuit further includes:

an error amplifier circuit which compares the voltage sampled by the second sample hold circuit with a predetermined voltage to output a voltage depending on a potential difference; and
a signal switching circuit which alternately transmits the voltage sampled and held by the first sample hold section and the voltage sampled and held by the second sample hold section to the error amplifier circuit.

13. The switching power supply apparatus according to claim 12, wherein the switching control circuit further includes a signal generation circuit which generates a switching control signal depending on a voltage output from the error amplifier circuit, and
wherein the switching transistor is turned on/off by the switching control signal generated by the signal generation circuit to apply current to the primary winding of the transformer.

14. A power supply control semiconductor integrated circuit which performs switching control of current flowing through a primary winding of a voltage converting transformer including an auxiliary winding on a primary side, to rectify current flowing through a secondary winding of the transformer by a rectifier diode, and to smooth the current by a smoothing condenser so as to output a secondary side voltage, wherein the power supply control semiconductor integrated circuit comprises:
a detection circuit which includes a differentiating circuit and which detects a falling edge of a terminal voltage of the auxiliary winding by the differentiating circuit; and
a switching transistor which is connected to the primary winding of the transformer, and which is controlled based on a result of sampling the terminal voltage of the auxiliary winding, which sampling is performed at a time immediately before current flowing through the rectifier diode becomes zero based on a detection timing of the detection circuit.

15. The power supply control semiconductor integrated circuit according to claim 14, further comprising:
a hold section which holds the terminal voltage of the auxiliary winding at the time immediately before the falling edge thereof; and
a sample hold circuit which performs sampling of the voltage held by the hold section based on a detection output of the detection circuit.

16. The power supply control semiconductor integrated circuit according to claim 15, wherein:
the hold section comprises a previous stage sample hold circuit which performs sampling of a voltage depending on the terminal voltage of the auxiliary winding based on a pulse signal of a predetermined frequency,
the previous stage sample hold circuit includes:
a first sample hold section which performs sampling of a voltage depending on the terminal voltage of the auxiliary winding based on a first pulse signal of a predetermined frequency; and
a second sample hold section which performs sampling of a voltage depending on the terminal voltage of the auxiliary winding based on a second pulse signal having a frequency as same as that of the first pulse signal and a phase different from that of the first pulse signal,
the sample hold circuit includes:
a third sample hold section which performs sampling of the voltage held by the first sample hold section based on a detection output of the detection circuit; and a fourth sample hold section which performs sampling of the voltage held by the second sample hold section based on a detection output of the detection circuit, and a higher voltage among the voltage held by the third sample hold section and the voltage held by the fourth sample hold section is selected as an output of the sample hold circuit, and T1 and T2 are set to be T1<T2, where T1 is a time from a falling edge of the first pulse signal to a rising edge of an output pulse of the detection circuit and T2 is the time from a falling edge of the second pulse signal to a rising edge of the first pulse.

17. The power supply control semiconductor integrated circuit according to claim 16, wherein the sample hold circuit further includes:

third and fifth sample hold sections which perform sampling of a first voltage held by the first sample hold section based on a detection output of the detection circuit; and fourth and sixth sample hold sections which perform sampling of a second voltage held by the second sample hold section based on a detection output of the detection circuit, and wherein:

the third sample hold section repeats a sampling operation and a holding operation of the first voltage alternately in every period, the fifth sample hold section performs a sampling operation of the first voltage during holding of the third sample hold section, and performs a holding operation of the first voltage during sampling of the third sample hold section, the fourth sample hold section performs a sampling operation and a holding operation of the second voltage alternately concurrently with the third sample hold section, the sixth sample hold section performs a sampling operation and a holding operation of the second voltage alternately concurrently with the fifth sample hold section, and a higher voltage among the voltages sampled and held by the third and fourth sample hold sections and a higher voltage among the voltages sampled and held by the fifth and sixth sample hold sections are selected alternately in every period as an output of the sample hold circuit.

18. The power supply control semiconductor integrated circuit according to claim 16, further comprising:

an oscillation circuit which generates an oscillation signal of a predetermined frequency or a frequency divider circuit which divides a signal of a predetermined frequency;

a rising edge detection circuit which detects a rising edge of an output signal of the oscillation circuit or the frequency divider circuit; and a falling edge detection circuit which detects a falling edge of an output signal of the oscillation circuit or the frequency divider circuit, wherein the first pulse signal comprises the output signal of the rising edge detection circuit and the second pulse signal comprises the output signal of the falling edge detection circuit.

19. A switching power supply apparatus comprising a voltage converting transformer including an auxiliary winding on a primary side and a switching control circuit, wherein the switching control circuit includes:

a detection circuit which detects a falling edge of a terminal voltage of the auxiliary winding to output a pulse;

a hold section which holds the terminal voltage of the auxiliary winding at a time immediately before the falling edge thereof; and a sample hold circuit which performs sampling of the voltage held by the hold section based on a detection output of the detection circuit, wherein the hold section comprises a previous stage sample hold circuit which performs sampling of a voltage depending on the terminal voltage of the auxiliary winding based on a pulse signal of a predetermined frequency, the previous stage sample hold circuit including:

a first sample hold section which performs sampling of a voltage depending on the terminal voltage of the auxiliary winding based on a first pulse signal of a predetermined frequency; and a second sample hold section which performs sampling of a voltage depending on the terminal voltage of the auxiliary winding based on a second pulse signal having a same frequency as that of the first pulse signal and having a phase different from that of the first pulse signal, wherein the sample hold circuit includes:

a third sample hold section which performs sampling of the voltage held by the first sample hold section based on a detection output of the detection circuit; and a fourth sample hold section which performs sampling of the voltage held by the second sample hold section based on a detection output of the detection circuit, wherein a higher voltage among the voltage held by the third sample hold section and the voltage held by the fourth sample hold section is selected as an output of the sample hold circuit, wherein a switching transistor connected to a primary winding of the transformer is controlled based on the terminal voltage of the auxiliary winding at a time immediately before current flowing through a secondary rectifier diode of the switching power supply apparatus becomes zero, which terminal voltage is obtained based on a detection timing of the detection circuit, and wherein T1 and T2 are set to be T1<T2, where T1 is the time from a falling edge of the first pulse signal to a rising edge of an output pulse of the detection circuit and T2 is the time from a falling edge of the second pulse signal to a rising edge of the first pulse.

20. The switching power supply apparatus according to claim 19, further comprising:

an oscillation circuit which generates an oscillation signal of a predetermined frequency or a frequency divider circuit which divides a signal of a predetermined frequency;

a rising edge detection circuit which detects a rising edge of an output signal of the oscillation circuit or the frequency divider circuit; and a falling edge detection circuit which detects a falling edge of an output signal of the oscillation circuit or the frequency divider circuit, wherein the first pulse signal comprises the output signal of the rising edge detection circuit and the second pulse signal comprises the output signal of the falling edge detection circuit.

21. The switching power supply apparatus according to claim 20, wherein each of the rising edge detection circuit and the falling edge detection circuit includes a signal delay section and an AND circuit which receives a signal which has passed through the signal delay section and a signal which has not passed through signal delay section.

22. The switching power supply apparatus according to claim 19, wherein the sample hold circuit further includes:
third and fifth sample hold sections which perform sampling of the first voltage held by the first sample hold section based on a detection output of the detection circuit; and
fourth and sixth sample hold sections which perform sampling of the second voltage held by the second sample hold section based on a detection output of the detection circuit, and
wherein:
the third sample hold section repeats a sampling operation and a holding operation of the first voltage alternately in every period,
the fifth sample hold section performs a sampling operation of the first voltage during holding of the third sample hold section, and performs a holding operation of the first voltage during sampling of the third sample hold section,
the fourth sample hold section performs a sampling operation and a holding operation of the second voltage alternately concurrently with the third sample hold section,
the sixth sample hold section performs a sampling operation and a holding operation of the second voltage alternately concurrently with the fifth sample hold section, and
a higher voltage among the voltages sampled and held by the third and fourth sample hold sections and a higher voltage among the voltages sampled and held by the fifth and sixth sample hold sections are selected alternately in every period as an output of the sample hold circuit.

23. The switching power supply apparatus according to claim 22, wherein the switching control circuit further includes:
an error amplifier circuit which compares the voltage sampled by the sample hold circuit with a predetermined voltage to output a voltage depending on a potential difference; and
a signal switching circuit which transmits a higher voltage among the voltage held by the third or fifth sample hold section and the voltage held by the fourth or sixth sample hold section to the error amplifier circuit.

24. The switching power supply apparatus according to claim 23, wherein the switching control circuit further includes a signal generation circuit which generates a switching control signal depending on a voltage output from the error amplifier circuit, and
wherein the switching transistor is operated so as to be turned on/off according to the switching control signal generated by the signal generation circuit to apply current to the primary winding of the transformer.

* * * * *